(12) United States Patent
Salsamendi et al.

(10) Patent No.: US 10,846,404 B1
(45) Date of Patent: *Nov. 24, 2020

(54) COLLECTING ALGORITHMICALLY GENERATED DOMAINS

(71) Applicant: Palo Alto Networks, Inc., Santa Clara, CA (US)

(72) Inventors: Ryan C. Salsamendi, Campbell, CA (US); Robert A. Seger, San Jose, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/655,779

(22) Filed: Jul. 20, 2017

Related U.S. Application Data (63) Continuation of application No. 14/575,954, filed on Dec. 18, 2014, now Pat. No. 9,805,193.

(51) Int. Cl.
*G06F 21/56* (2013.01)

(52) U.S. Cl.
CPC .......... *G06F 21/566* (2013.01); *G06F 21/562* (2013.01); *G06F 2221/033* (2013.01)

(58) Field of Classification Search
CPC ................ G06F 21/566; G06F 21/562; G06F 2221/033
USPC ......................................................... 726/23
See application file for complete search history.

(56) References Cited

U.S. PATENT DOCUMENTS

| | | | |
|---|---|---|---|
| 5,983,348 A | 11/1999 | Ji | |
| 6,192,444 B1 | 2/2001 | White | |
| 7,366,652 B2 | 4/2008 | Wang | |
| 7,409,718 B1 | 8/2008 | Hong | |
| 7,475,002 B1 * | 1/2009 | Mann | .......... G06F 9/45558 703/21 |
| 7,496,963 B2 | 2/2009 | Shipp | |
| 7,568,233 B1 | 7/2009 | Szor | |
| 7,603,713 B1 | 10/2009 | Belov | |
| 7,649,838 B2 | 1/2010 | Fishteyn | |
| 7,664,855 B1 | 2/2010 | Freed | |
| 7,779,472 B1 | 8/2010 | Lou | |

(Continued)

FOREIGN PATENT DOCUMENTS

| | | |
|---|---|---|
| WO | WO-2012134584 A1 | 10/2012 |
| WO | WO-2013067505 A1 | 5/2013 |

(Continued)

OTHER PUBLICATIONS

Zou, "Detecting Malware Based on DNS Graph Mining", Apr. 17, 2015, Hindawi Publishing Corporation, vol. 2015, pp. 1-12 (Year: 2015).*

(Continued)

*Primary Examiner* — Alexander Lagor
*Assistant Examiner* — Gregory A Lane
(74) *Attorney, Agent, or Firm* — Van Pelt, Yi & James LLP (57) ABSTRACT

Generating a set of attempted external contacts associated with a malware sample is disclosed. A malware sample is executed, in an accelerated computing environment. In the accelerated computing environment, a guest time is advanced more quickly than a time by which a host time is advanced. A set of one or more attempted external contacts generated by the executing malware sample is recorded. The set of attempted external contacts is provided as output.

36 Claims, 5 Drawing Sheets

(56) References Cited

U.S. PATENT DOCUMENTS

| | | | |
|---|---|---|---|
| 7,805,379 B1* | 9/2010 | Adkins, III | G06Q 30/0645 705/307 |
| 7,823,202 B1 | 10/2010 | Nucci | |
| 7,870,610 B1 | 1/2011 | Mitchell | |
| 7,930,273 B1 | 4/2011 | Clark | |
| 7,945,908 B1* | 5/2011 | Waldspurger | G06F 9/45533 710/260 |
| 7,958,555 B1 | 6/2011 | Chen | |
| 8,011,010 B2 | 8/2011 | Michael | |
| 8,141,132 B2 | 3/2012 | Oliver | |
| 8,151,352 B1 | 4/2012 | Novitchi | |
| 8,201,246 B1 | 6/2012 | Wu | |
| 8,209,680 B1 | 6/2012 | Le | |
| 8,225,317 B1 | 7/2012 | Chiueh | |
| 8,239,492 B2 | 8/2012 | Pottenger | |
| 8,239,608 B1 | 8/2012 | Ginzton | |
| 8,260,914 B1* | 9/2012 | Ranjan | H04L 61/1511 709/224 |
| 8,291,468 B1 | 10/2012 | Chickering | |
| 8,316,440 B1 | 11/2012 | Hsieh | |
| 8,321,936 B1 | 11/2012 | Green | |
| 8,347,100 B1 | 1/2013 | Thornewell | |
| 8,359,651 B1 | 1/2013 | Wu | |
| 8,364,664 B2 | 1/2013 | Bennett | |
| 8,370,938 B1 | 2/2013 | Daswani | |
| 8,402,529 B1 | 3/2013 | Green | |
| 8,402,543 B1 | 3/2013 | Ranjan | |
| 8,407,324 B2 | 3/2013 | McDougal | |
| 8,438,639 B2 | 5/2013 | Lee | |
| 8,443,363 B1 | 5/2013 | Brennan, III | |
| 8,443,449 B1 | 5/2013 | Fan | |
| 8,464,341 B2 | 6/2013 | Cohen | |
| 8,479,295 B2 | 7/2013 | Sahita | |
| 8,484,732 B1 | 7/2013 | Chen | |
| 8,484,739 B1 | 7/2013 | Seshadri | |
| 8,495,742 B2 | 7/2013 | Abadi | |
| 8,510,827 B1 | 8/2013 | Leake | |
| 8,516,591 B2 | 8/2013 | Fly | |
| 8,521,667 B2 | 8/2013 | Zhu | |
| 8,533,842 B1 | 9/2013 | Satish | |
| 8,539,577 B1 | 9/2013 | Stewart | |
| 8,566,928 B2 | 10/2013 | Dagon | |
| 8,566,946 B1 | 10/2013 | Aziz | |
| 8,572,740 B2 | 10/2013 | Mashevsky | |
| 8,578,481 B2 | 11/2013 | Rowley | |
| 8,584,239 B2 | 11/2013 | Aziz | |
| 8,631,489 B2 | 1/2014 | Antonakakis | |
| 8,646,071 B2 | 2/2014 | Pereira | |
| 8,646,088 B2 | 2/2014 | Pistoia | |
| 8,656,491 B1 | 2/2014 | Daswani | |
| 8,677,487 B2 | 3/2014 | Balupari | |
| 8,683,584 B1 | 3/2014 | Daswani | |
| 8,707,441 B1 | 4/2014 | Cidambi | |
| 8,726,386 B1 | 5/2014 | McCorkendale | |
| 8,756,691 B2 | 6/2014 | Nachenberg | |
| 8,763,071 B2 | 6/2014 | Sinha | |
| 8,763,125 B1 | 6/2014 | Feng | |
| 8,806,647 B1 | 8/2014 | Daswani | |
| 8,813,240 B1 | 8/2014 | Northup | |
| 8,826,426 B1 | 9/2014 | Dubey | |
| 8,838,570 B1 | 9/2014 | English | |
| 8,863,288 B1 | 10/2014 | Savage | |
| 8,893,124 B2 | 11/2014 | Bork | |
| 8,931,088 B2 | 1/2015 | Chen | |
| 8,966,625 B1 | 2/2015 | Zuk | |
| 9,003,526 B2 | 4/2015 | El-Moussa | |
| 9,049,221 B1 | 6/2015 | Yen | |
| 9,117,079 B1 | 8/2015 | Huang | |
| 9,141,801 B2 | 9/2015 | Moon | |
| 9,152,694 B1 | 10/2015 | Padidar | |
| 9,165,142 B1 | 10/2015 | Sanders | |
| 9,183,383 B1 | 11/2015 | Yablokov | |
| 9,213,838 B2 | 12/2015 | Lu | |
| 9,223,962 B1 | 12/2015 | Kashyap | |
| 9,245,121 B1* | 1/2016 | Luo | H04L 63/1408 |
| 9,294,486 B1 | 3/2016 | Chiang | |
| 9,317,680 B2 | 4/2016 | Carter, III | |
| 9,361,089 B2 | 6/2016 | Bradfield | |
| 9,516,039 B1* | 12/2016 | Yen | H04L 63/14 |
| 9,516,053 B1 | 12/2016 | Muddu | |
| 9,519,781 B2 | 12/2016 | Golshan | |
| 9,591,003 B2 | 3/2017 | Johansson | |
| 9,626,509 B1 | 4/2017 | Khalid | |
| 9,792,430 B2* | 10/2017 | Golshan | G06F 21/53 |
| 9,852,290 B1* | 12/2017 | Kirk | G06F 21/53 |
| 10,019,575 B1 | 7/2018 | Wang | |
| 10,445,216 B2 | 10/2019 | Mola | |
| 10,534,687 B2 | 1/2020 | Fahim | |
| 10,534,749 B1 | 1/2020 | Miah | |
| 2003/0191911 A1 | 10/2003 | Kleinschnitz | |
| 2004/0030913 A1 | 2/2004 | Liang | |
| 2004/0107416 A1 | 6/2004 | Buban | |
| 2004/0133796 A1 | 7/2004 | Cohen | |
| 2005/0149726 A1 | 7/2005 | Joshi | |
| 2005/0177602 A1 | 8/2005 | Kaler | |
| 2005/0240756 A1 | 10/2005 | Mayer | |
| 2005/0283837 A1 | 12/2005 | Olivier | |
| 2006/0021029 A1 | 1/2006 | Brickell | |
| 2006/0168024 A1 | 7/2006 | Mehr | |
| 2007/0039053 A1 | 2/2007 | Dvir | |
| 2007/0050850 A1 | 3/2007 | Katoh | |
| 2007/0055711 A1 | 3/2007 | Polyakov | |
| 2007/0079375 A1 | 4/2007 | Copley | |
| 2007/0106986 A1 | 5/2007 | Worley, Jr. | |
| 2007/0174915 A1 | 7/2007 | Gribble | |
| 2007/0192857 A1 | 8/2007 | Ben-Itzhak | |
| 2007/0219772 A1 | 9/2007 | Kfir | |
| 2007/0261112 A1 | 11/2007 | Todd | |
| 2008/0016552 A1 | 1/2008 | Hart | |
| 2008/0127338 A1 | 5/2008 | Cho | |
| 2008/0155694 A1* | 6/2008 | Kwon | H04L 29/12066 726/23 |
| 2008/0177755 A1 | 7/2008 | Stern | |
| 2008/0177994 A1 | 7/2008 | Mayer | |
| 2008/0209562 A1 | 8/2008 | Szor | |
| 2008/0229393 A1 | 9/2008 | Congdon | |
| 2008/0256633 A1 | 10/2008 | Arnold | |
| 2008/0262991 A1* | 10/2008 | Kapoor | G06F 21/55 706/20 |
| 2008/0263658 A1 | 10/2008 | Michael | |
| 2008/0263659 A1 | 10/2008 | Alme | |
| 2008/0320594 A1 | 12/2008 | Jiang | |
| 2009/0007100 A1 | 1/2009 | Field | |
| 2009/0019547 A1 | 1/2009 | Palliyil | |
| 2009/0036111 A1 | 2/2009 | Danford | |
| 2009/0055928 A1 | 2/2009 | Kang | |
| 2009/0077383 A1 | 3/2009 | De Monseignat | |
| 2009/0144826 A2 | 6/2009 | Piccard | |
| 2009/0150419 A1 | 6/2009 | Kim | |
| 2009/0235357 A1 | 9/2009 | Ebringer | |
| 2009/0241190 A1 | 9/2009 | Todd | |
| 2009/0254989 A1 | 10/2009 | Achan | |
| 2009/0265786 A1 | 10/2009 | Xie | |
| 2009/0282485 A1 | 11/2009 | Bennett | |
| 2009/0288167 A1 | 11/2009 | Freericks | |
| 2010/0037314 A1 | 2/2010 | Perdisci | |
| 2010/0043072 A1 | 2/2010 | Rothwell | |
| 2010/0077481 A1 | 3/2010 | Polyakov | |
| 2010/0107252 A1 | 4/2010 | Mertoguno | |
| 2010/0115586 A1 | 5/2010 | Raghavan | |
| 2010/0154059 A1 | 6/2010 | McNamee | |
| 2010/0162350 A1 | 6/2010 | Jeong | |
| 2010/0175132 A1 | 7/2010 | Zawadowskiy | |
| 2010/0281458 A1 | 11/2010 | Paladino | |
| 2010/0333168 A1 | 12/2010 | Herrod | |
| 2011/0041179 A1 | 2/2011 | Staahlberg | |
| 2011/0055923 A1 | 3/2011 | Thomas | |
| 2011/0090911 A1 | 4/2011 | Hao | |
| 2011/0099620 A1 | 4/2011 | Stavrou | |
| 2011/0161955 A1 | 6/2011 | Woller | |
| 2011/0167495 A1 | 7/2011 | Antonakakis | |
| 2011/0173698 A1 | 7/2011 | Polyakov | |
| 2011/0185425 A1 | 7/2011 | Lee | |
| 2011/0208714 A1 | 8/2011 | Soukal | |

(56) References Cited

U.S. PATENT DOCUMENTS

| | | |
|---|---|---|
| 2011/0239299 A1 | 9/2011 | Chen |
| 2011/0252474 A1 | 10/2011 | Ward |
| 2011/0271342 A1 | 11/2011 | Chung |
| 2011/0276695 A1 | 11/2011 | Maldaner |
| 2011/0283360 A1 | 11/2011 | Abadi |
| 2011/0296412 A1 | 12/2011 | Banga |
| 2011/0296486 A1 | 12/2011 | Burch |
| 2012/0042381 A1 | 2/2012 | Antonakakis |
| 2012/0054869 A1 | 3/2012 | Yen |
| 2012/0079596 A1 | 3/2012 | Thomas |
| 2012/0084860 A1 | 4/2012 | Cao |
| 2012/0089700 A1 | 4/2012 | Safruti |
| 2012/0096549 A1 | 4/2012 | Amini |
| 2012/0110174 A1 | 5/2012 | Wootton |
| 2012/0117650 A1 | 5/2012 | Nachenberg |
| 2012/0117652 A1 | 5/2012 | Manni |
| 2012/0192274 A1 | 7/2012 | Odom |
| 2012/0233691 A1 | 9/2012 | Jiang |
| 2012/0240183 A1 | 9/2012 | Sinha |
| 2012/0240224 A1 | 9/2012 | Payne |
| 2012/0255018 A1 | 10/2012 | Sallam |
| 2012/0255019 A1 | 10/2012 | McNamee |
| 2012/0255021 A1 | 10/2012 | Sallam |
| 2012/0255031 A1 | 10/2012 | Sallam |
| 2012/0278889 A1 | 11/2012 | El-Moussa |
| 2012/0291042 A1* | 11/2012 | Stubbs ............... G06F 1/3203 718/104 |
| 2012/0291131 A1 | 11/2012 | Turkulainen |
| 2013/0007245 A1 | 1/2013 | Malik |
| 2013/0014259 A1 | 1/2013 | Gribble |
| 2013/0047147 A1 | 2/2013 | McNeill |
| 2013/0055394 A1 | 2/2013 | Beresnevichiene |
| 2013/0091350 A1 | 4/2013 | Gluck |
| 2013/0091570 A1 | 4/2013 | McCorkendale |
| 2013/0091571 A1 | 4/2013 | Lu |
| 2013/0104230 A1 | 4/2013 | Tang |
| 2013/0117848 A1 | 5/2013 | Golshan |
| 2013/0117852 A1 | 5/2013 | Stute |
| 2013/0122861 A1 | 5/2013 | Kim |
| 2013/0145002 A1 | 6/2013 | Kannan |
| 2013/0145008 A1 | 6/2013 | Kannan |
| 2013/0152200 A1 | 6/2013 | Alme |
| 2013/0160130 A1 | 6/2013 | Mendelev |
| 2013/0191915 A1 | 7/2013 | Antonakakis |
| 2013/0212684 A1 | 8/2013 | Li |
| 2013/0227165 A1 | 8/2013 | Liu |
| 2013/0232574 A1 | 9/2013 | Carothers |
| 2013/0246685 A1 | 9/2013 | Bhargava |
| 2013/0298184 A1 | 11/2013 | Ermagan |
| 2013/0298192 A1 | 11/2013 | Kumar |
| 2013/0298230 A1 | 11/2013 | Kumar |
| 2013/0298242 A1 | 11/2013 | Kumar |
| 2013/0298243 A1 | 11/2013 | Kumar |
| 2013/0298244 A1 | 11/2013 | Kumar |
| 2013/0326625 A1 | 12/2013 | Anderson |
| 2013/0347094 A1 | 12/2013 | Bettini |
| 2014/0006734 A1 | 1/2014 | Li |
| 2014/0059641 A1 | 2/2014 | Chapman, II |
| 2014/0096131 A1 | 4/2014 | Sonnek |
| 2014/0130158 A1 | 5/2014 | Wang |
| 2014/0189862 A1* | 7/2014 | Kruglick ............... G06F 21/55 726/22 |
| 2014/0283037 A1 | 9/2014 | Sikorski |
| 2014/0337836 A1 | 11/2014 | Ismael |
| 2014/0351935 A1 | 11/2014 | Shao |
| 2014/0380474 A1 | 12/2014 | Paithane |
| 2015/0047033 A1 | 2/2015 | Thomas |
| 2015/0058984 A1 | 2/2015 | Shen |
| 2015/0067673 A1* | 3/2015 | Wang ............... G06F 9/45558 718/1 |
| 2015/0067862 A1 | 3/2015 | Yu |
| 2015/0074810 A1 | 3/2015 | Saher |
| 2015/0096025 A1 | 4/2015 | Ismael |
| 2015/0195299 A1 | 7/2015 | Zoldi |
| 2015/0199207 A1 | 7/2015 | Lin |
| 2016/0036836 A1 | 2/2016 | Grill |
| 2016/0099951 A1 | 4/2016 | Kashyap |
| 2016/0342787 A1 | 11/2016 | Wang |
| 2017/0093910 A1 | 3/2017 | Gukal |
| 2017/0323102 A1* | 11/2017 | Manadhata ......... H04L 61/1511 |
| 2020/0019424 A1 | 1/2020 | Wang |

FOREIGN PATENT DOCUMENTS

| | | |
|---|---|---|
| WO | WO-2013067508 | 5/2013 |
| WO | WO-2013134206 A1 | 9/2013 |

OTHER PUBLICATIONS

Yadav, "Detecting Algorithmically Generated Domain-Flux Attacks with DNS Traffic Analysis", 2012, pp. 1-15 (Year: 2012).*

Author Unknown, A Day in the Life of a BotArmy, Damballa, 2008.

Author Unknown, Advanced Persistent Threats (APT), What's an APT? A Brief Definition, Damballa, Dec. 14, 2010.

Author Unknown, Anatomy of a Targeted Attack, Damballa, Dec. 3, 2008.

Author Unknown, AV, IDS/IPS and Damballa's Response to Targeted Attacks, A Technology Comparison, Damballa, Nov. 2008.

Author Unknown, Closed Window, How Failsafe Enhancements Dramatically Limit Opportunities for Malware Armies and other Targeted Attacks, Damballa, Sep. 23, 2009.

Author Unknown, Damballa: A Different Approach, Targeted Attacks Requires a New Solution, Damballa, Sep. 23, 2008.

Author Unknown, Damballa's In-The-Cloud Security Model, Enterprise Protection Moves Beyond the Network Perimeter, Damballa, Aug. 24, 2008.

Author Unknown, Executive Overview, The Command Structure of the Aurora Botnet, Damballa, Mar. 2010.

Author Unknown, FireEye Malware Analysis, FireEye.com, FireEye, Inc., 2010.

Author Unknown, How to Be a Hero in the War Against BotArmies, Damballa, 2008.

Author Unknown, 'Hybrid Sandboxing for Detecting and Analyzing Advanced and Unknown Malware', Blue Coat Systems, Inc., Nov. 2013.

Author Unknown, Layer 8, How and Why Targeted Attacks Exploit Your Users, Damballa, Nov. 2011.

Author Unknown, 'Multi-Vector Virtual Execution (MVX) Engine', FireEye, Inc., http://www.fireeye.com/products-and-solutions/virtual-execution-engine.html, Jun. 2014.

Author Unknown, Targeted Attacks for Fun and Profit, An Executed Guide to a New and Growing Enterprise Threat, Damballa, Oct. 13, 2008.

Author Unknown, Trust Betrayed, What to Do When a Targeted Attack Turns Your Networks Against You, Damballa, Feb. 22, 2008.

Author Unknown, Updated on the Enemy, A Deconstruction of Who Profits From Botnets, Damballa, May 13, 2009.

Barr, The VMware Mobile Virtualization Platform: Is that a Hypervisor in your Pocket?, Dec. 2010, VMware, p. 124-135.

Binkley et al., An Algorithm for Anomaly-based Botnet Detection, Jul. 2006.

Davidoff et al., 'Chapter 12: Malware Forensics,' Network Forensics: Tracking Hackers Through Cyberspace, Pearson Education Inc., Jun. 2012, 60 pages.

Dittrich et al., P2P as Botnet Command and Control; A Deeper Insight, 2008 3rd International Conference on Malicious and Unwanted Software (MALWARE), Oct. 2008, IEEE, vol. 10, pp. 41-48.

Giroire et al., Exploiting Temporal Persistence to Detect Convert Botnet Channels, Sep. 2009.

Goebel et al., Rishi: Identify Bot Contaminated Hosts by IRC Nickname Evaluation, Apr. 2007.

Gu et al., BotHunter: Detecting Malware Infection Through IDS-Driven Dialog Correlation, Aug. 2007.

Gu et al., BotMiner: Clustering Analysis of Network Traffic for Protocol- and Structure-Independent Botnet Detection, Jul. 2008.

Gu et al., BotSniffer: Detecting Botnet Command and Control Channels in Network Traffic, Feb. 2008.

(56) References Cited

OTHER PUBLICATIONS

Gunter Ollmann, Botnet Communication Topologies, Understanding the Intricacies of Bonet Command and Control, Damballa, Jun. 2009.
Gunter Ollmann, Extracting CnC from Malware, The Role of malware Sample Analysis in Botnet Detection, Damballa, Dec. 8, 2009.
Gunter Ollmann, Serial Variant Evasion Tactics, Techniques Used to Automatically Bypass Antivirus Technologies, Damballa, Oct. 7, 2009.
Gunter Ollmann, The Botnet vs. Malware Relationship, The One to one Botnet Myth, Damballa, Jun. 2009.
Gunter Ollmann, The Opt-IN Botnet Generation, Hacktivism and Centrally Controlled Protesting, Social Networks, Damballa, Apr. 26, 2010.
Karasaridis, Anestis et al., Wide-scale Botnet Detection and Characterization, Dec. 14, 2010.
Landecki, Grzegorz, Detecting Botnets, Linux Journal, Jan. 1, 2009.
Lau et al., 'Measuring Virtual Machine Detection in Malware using DSD Tracer', Journal in Computer Virology, Aug. 2008.
Ligh et al., 'Chapter 5: Researching Domains and IP Addresses,' Malware Analyst's Cookbook, John Wiley & Sons, Nov. 2010, 38 pages.
Lindorfer et al., 'Detecting Enviroment-Sensitive Malware', Recent Advances in Intrusion Detection. Springer Berlin Heidelberg, Jan. 2011.
Livadas et al., Using Machine Learning Techniques to Identify Botnet Traffic, BBN Technologies, Nov. 2006.
Nazario et al., As the Net Churns: Fast-Flux Botnet Observations, IEEE, pp. 24-31, Sep. 5, 2008.
Paul Royal, Analysis of the Kraken Botnet, Damballa, Apr. 9, 2008.
Rajab et al., 'A Multifaceted Approach to Understanding the Botnet Phenonmenon,' Proceedings of the 6th ACM SIGCOMM Conference on Internet Measurement, Oct. 2006, 12 pages.
Ramachandran, Anirudh et al., Revealing Botnet Membership Using DNSBL Counter-Intelligence, Jul. 7, 2006.
Russ White, 'High Availability in Routing', Mar. 2004, Cisco Systems, vol. 7, Issue 1, pp. 2-14.
Schechter et al., 'Fast Detection of Scanning Worm Infections,' Recent Advances in Intrusion Detection: 7th International Symposium RAID 2004 Proceedings, Jan. 2004, 24 pages.
Shabtai et al., Andromaly: A Behavioral Malware Detection Framework for Devices, J Intell Inf Syst (2012) 38:161-190, Springer, Jan. 6, 2011.
Sikorski et al., 'Chapter 14: Malware-Focused Network Signatures,' Practical Malware Anlaysis, No Starch Press, Feb. 2012, 13 pages.
Singh et al., 'Hot Knives Through Butter: Evading File-based Sandboxes', FireEye, Inc., Feb. 2014.
Strayer et al. Detecting Botnets with Tight Command and Control, BBN Technologies, 2006.
Sun et al, Malware Virtualization-resitant behavior detection, 2011 IEEE, pp. 912-917.
Van Der Heide et al., 'DNS Anomaly Detection,' System and Network Engineering Research Group, University of Amsterdam, Feb. 6, 2011, 20 pages.
Wagener et al., 'An Instrumented Analysis of Unknown Software and Malware Driven by Free Libre Open Source Software', Signal Image Technology and Internet Based Systems, 2008. SITIS'08. IEEE International Conference on. IEEE, Nov. 2008.
Yadav et al., 'Detecting Algorithmically Generated Malicious Domain Names', Nov. 2010.
Yen, Ting-Fang et al., Traffic Aggregation for Malware Detection, Jul. 2008.
Zang et al., Botnet Detection Through Fine Flow Classification, CSE Dept., Technical Report No. CSE11-001, p. 1-17, Jan. 31, 2011.
Karagiannis et al., BLINC: Multilevel Traffic Classification in the Dark, ACM SIGCOMM Computer Communication Review, Retrieved From https://www.microsoft.com/en-us/research/wp-content/uploads/2016/02/BLINC_TR.pdf, published 2005.
Rasing et al., an Android Application Sandbox System for Suspicious Software Detection, Malicious and Unwanted Software (Malware), 2010 5th International Conferences on IEEE, 2010.
Chen et al., Chapter 4: Guarding Against Network Intrusions, Network and System Security, Elsevier Inc., Feb. 2009, 5 pages.
Chen et al., Software-Defined Mobile Networks Security, Mobile Netw Appl, (2016), 21:729-743, Jan. 9, 2016.
Li et al., "DroidBot: A Lightweight UI-Guided Test Input Generator for Android", 2017.
Liu et al., an Automatic UI Interaction Script Generator for Android Applications Using Activity Call Graph Analysis. Eurasia Journal of Mathematics, Science and Technology Education, 14(7), 3159-3179. 2018.
Min et al., Runtime-Based Behavior Dynamic Analysis System for Android Malware Detection, Atlantis Press, ICCIA 2012, Dec. 2012.
Rastogi et al., AppsPlayground: Automatic Security Analysis of Smartphone Applications, ACM, Feb. 2013.
Spreitzenbarth et al., "Mobile-Sandbox: Having a Deeper Look into Android Applications", from Proceedings of the 28th Annual ACM Symposium on Applied Computing, pp. 1808-1815, Mar. 2013.
Sylve et al., "Acquisition and analysis of volatile memory from android devices." Digital Investigation 83-4, pp. 175-184. 2012.
Zheng et al., "SmartDroid: An Automatic System for Revealing UI-based Trigger Conditions in Android Applications", Oct. 19, 2012.
Zhou et al., Dissecting Android Malware: Characterization and Evolution, IEEE, 2012.

\* cited by examiner

COLLECTING ALGORITHMICALLY GENERATED DOMAINS

CROSS REFERENCE TO OTHER APPLICATIONS

This application is a continuation of co-pending U.S. patent application Ser. No. 14/575,954 entitled COLLECTING ALGORITHMICALLY GENERATED DOMAINS filed Dec. 18, 2014 which is incorporated herein by reference for all purposes.

BACKGROUND OF THE INVENTION

Nefarious individuals attempt to compromise computer systems in a variety of ways. As one example, such individuals may embed or otherwise include malicious software ("malware") in email attachments and transmit or cause the malware to be transmitted to unsuspecting users. When executed, the malware compromises the victim's computer. Some types of malware will instruct a compromised computer to communicate with a remote host. For example, malware can turn a compromised computer into a "bot" in a "botnet," receiving instructions from and/or reporting data to a command and control (C&C) server under the control of the nefarious individual. One approach to mitigating the damage caused by malware is for a security company (or other appropriate entity) to attempt to identify malware and prevent it from reaching/executing on end user computers. Another approach is to try to prevent compromised computers from communicating with the C&C server. Unfortunately, malware authors are using increasingly sophisticated techniques to obfuscate the workings of their software. Accordingly, there exists an ongoing need for improved techniques to detect malware and prevent its harm.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
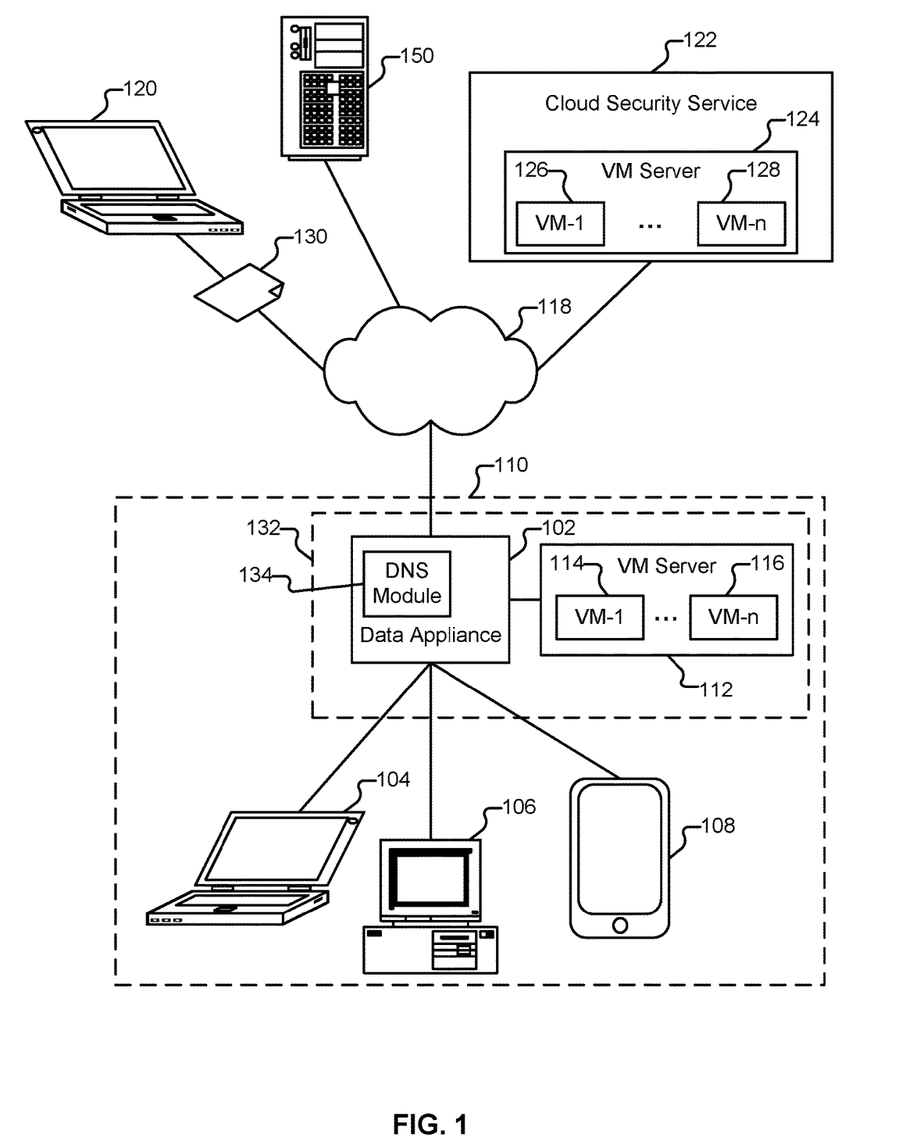
FIG. 1 illustrates an example of an environment in which malware is detected and its harm reduced.

FIG. 1 illustrates an example of an environment in which malware is detected and its harm reduced. In the example shown in FIG. 1, a malicious individual (using system 120) has created malware 130. The malicious individual hopes that a client device, such as client device 104, will execute a copy of malware 130, compromising the client device, and causing the client device to become a bot in a botnet. The compromised client device can then be instructed to perform tasks (e.g., cryptocurrency mining, or participating in denial of service attacks) and to report information to an external entity, such as command and control (C&C) server 150, as well as to receive instructions from C&C server 150, as applicable.

Suppose C&C server 150 is reachable by the domain "kjh2398sdfj.com," which the malware author registered on a Monday morning (e.g., at 00:01) using a stolen identity/credit card information. While malware 130 could explicitly include the domain "kjh2398sdfj.com" in its code, techniques such as static/dynamic analysis of malware 130 (described in more detail below) could make it possible for a security company (or other applicable entity, such as a security researcher) to identify the domain "kjh2398sdfj.com" as a C&C server, and take remedial actions (e.g., publish the domain "kjh2398sdfj.com" on a blacklist, and/or act to get the C&C server shut down/made unreachable). Further, if the domain "kjh2398sdfj.com" is hard coded into malware 130, once C&C server 150 is shut down, the malware author will potentially be unable to switch the command and control server used by malware 130 (e.g., switch the malware from contacting "kjh2398sdfj.com" to another, still reachable domain)—making the malware less useful to the malware author.

Instead of hard coding the domain "kjh2398sdfj.com" into malware 130, another approach is for the malware author to make use of algorithmically generated domains ("AGDs"). With AGDs, instead of trying to contact a specific, predetermined domain, malware 130 can programmatically generate multiple domain names and try to connect to each generated name in turn, until a successful connection is made. Further, the malware can continue to generate domain names, so that in the event "kjh2398sdfj.com" becomes no longer reachable, the malware can successfully contact the C&C server at a new domain.

In the following example, suppose malware 130 uses client device 104's system clock time as a seed, generates an ASCII string every five minutes, and then attempts to connect to the generated string (after adding an appropriate top level domain to the string, such as .com, as applicable). Malware 130 (e.g., when executing on a client device, such as client device 104) first generates "dwk2648vkwh.com" and attempts to connect to it Monday morning at 00:00. Since the malware author did not register "dwk2648vkwh.com" (and C&C server 150 is not reachable via "dwk2648vkwh.com"), no connection will be made to C&C server 150 by client device 104 via "dwk2648vkwh.com." At the next five minute mark, malware 130 (e.g., when executing on client device 104) will generate the domain "gwd4734qj5i.com" and attempt to connect to that domain (e.g., at 00:05). Malware 130 will continue generating domain names every five minutes (and attempting to connect to those domain names) until (e.g., at 01:15) it generates and is able to connect to "kjh2398sdfj.com" (which the malware author registered and brought online at 00:01 Monday).

Typically, a malware author will use a first domain (e.g., "kjh2398sdfj.com") for a period of time, such as two or three days (or a week), and then periodically switch the C&C server (or bring up other C&C servers, as applicable) to a new domain (e.g., "43hfd83hd3.com") to thwart efforts to shut the C&C server down/block access to the C&C server. The malware's domain generation algorithm will correspondingly generate the appropriate new, reachable, C&C domains (e.g., "43hfd83hd3.com") as well as other domains (e.g., every five minutes) that the author will not register—rotating through domain names the malware will use to successfully reach an appropriate C&C server. Since the author of malware 130 selected the domain generation algorithm (DGA) used by malware 130, the malware author is able to programmatically determine which domains will be generated by compromised machines (and at what date/time malware copies will attempt to communicate with those generated domains), and can therefore register a single appropriate domain for C&C use for a given time period. Typically, the malware author will register a new domain just before the domain is needed (e.g., within hours of when clients executing the domain generation algorithm would potentially start trying to connect to "43hfd83hd3.com").

The AGDs generated by malware 130 appear (e.g., to a researcher or other observer) seemingly random, and as such are problematic for security companies, particularly where a large number of domains are generated within a short period of time by the malware. If a security company is able to determine how the AGDs are generated by a particular piece of malware, the security company could potentially take remedial actions with respect to those domains. Unfortunately, malware authors typically obfuscate their domain generation algorithms, and do so at a level of sophistication that makes reverse engineering the malware (and domain generation algorithm) in a timely manner difficult, if not impossible. For example, a talented security researcher may need to expend months of effort to reverse engineer a single domain generation algorithm. In contrast, malware authors can modify the workings of their domain generation algorithms with relative ease/speed (e.g., changing the algorithm each week). By the time the researcher has discovered how the domain generation algorithm works, the malware author can easily have switched to a new algorithm, meaning the researcher will likely have to start analysis of the new algorithm from scratch—again taking potentially months to discover how the new algorithm works. As will be described in more detail below, using techniques described herein, the AGDs used by malware, such as malware 130, can be efficiently collected, and a variety of remedial actions taken in response to their collection, without requiring a researcher to determine (e.g., via reverse engineering) how the algorithm used to generate the AGDs works.

Returning to the example shown in FIG. 1, suppose client devices 104-108 are a laptop computer, a desktop computer, and a tablet (respectively) present in an enterprise network 110 (belonging to the "Acme Company"). Data appliance 102 is configured to enforce policies regarding communications between clients, such as clients 104 and 106, and nodes outside of enterprise network 110 (e.g., reachable via external network 118). Examples of such policies include ones governing traffic shaping, quality of service, and routing of traffic. Other examples of policies include security policies such as ones requiring the scanning for threats in incoming (and/or outgoing) email attachments, website downloads, files exchanged through instant messaging programs, and/or other file transfers. In some embodiments, appliance 102 is also configured to enforce policies with respect to traffic that stays within enterprise network 110.

Appliance 102 can take a variety of forms. For example, appliance 102 can comprise a dedicated device or set of devices. The functionality provided by appliance 102 can also be integrated into or executed as software on a general purpose computer, a computer server, a gateway, and/or a network/routing device. In some embodiments services provided by data appliance 102 are instead (or in addition) provided to client 104 by software executing on client 104. Whenever appliance 102 is described as performing a task, a single component, a subset of components, or all components of appliance 102 may cooperate to perform the task. Similarly, whenever a component of appliance 102 is described as performing a task, a subcomponent may perform the task and/or the component may perform the task in conjunction with other components. In various embodiments, portions of appliance 102 are provided by one or more third parties. Depending on factors such as the amount of computing resources available to appliance 102, various logical components and/or features of appliance 102 may be omitted and the techniques described herein adapted accordingly. Similarly, additional logical components/features can be included in embodiments of system 102 as applicable.

As will be described in more detail below, appliance 102 can be configured to work in cooperation with one or more virtual machine servers (112, 124) to perform malware analysis/prevention. As one example, data appliance 102 can be configured to provide a copy of malware 130 to one or more of the virtual machine servers for real-time analysis, in which the malware is executed in an instrumented virtual environment (e.g., where various user level hooks and/or kernel level hooks in an execution environment emulated in a virtual environment facilitate the monitoring of various program behaviors during execution in the virtual environment). As another example, service 122 can provide a list of signatures of known-malicious files to appliance 102 as part of a subscription. Those signatures can be generated by service 122 in conjunction with the techniques described herein. As yet another example, and as will be described in more detail below, results of analysis performed by the virtual machine servers can be used to generate/maintain blacklists of domains determined (or suspected) to be algorithmically generated by malware, and/or to take other actions, such as registering the algorithmically generated domains before the malware author does (thereby preventing the malware author from registering/using the algorithmically generated domain).

In various embodiments, data appliance 102 includes a DNS module 134, which is configured to receive a blacklist of known/suspected AGDs and prevent connections (e.g., by client devices 104-108) to those domains. DNS module 134 can be integrated into appliance 102 (as shown in FIG. 1) and can also operate as a standalone appliance in various embodiments. And, as with other components shown in FIG. 1, DNS module 134 can be provided by the same entity that provides appliance 102 (or cloud security service 122), and can also be provided by a third party (e.g., one that is different from the provider of appliance 102 or cloud security service 122). Further, instead of/in addition to preventing connections to known/suspected AGDs, DNS module 134 can take other actions, such as logging attempts by clients to access known/suspected AGDs on a blacklist (an indication that a given client is compromised and should be quarantined, or otherwise investigated by an administrator). DNS module 134 can perform other/additional services as well. As one example, DNS module 134 can be configured to monitor DNS requests (e.g., as received from client devices such as client device 104) for evidence that the client device has been infected with malware that makes use of algorithmically generated domains (e.g., where those domains are not already on a blacklist). As one example, DNS module 134 can employ statistical/heuristic analysis to DNS requests received from clients (e.g., examining for entropy in the requested domain names), and, when DNS module 134 determines the requests are suspicious (e.g., meet a threshold set of criteria), remedial actions can be taken with respect to the client device.

An example of a virtual machine server is a physical machine comprising commercially available server-class hardware (e.g., a multi-core processor, 64+ Gigabytes of RAM, and one or more Gigabit network interface adapters) that runs commercially available virtualization software, such as VMware ESXi, Citrix XenServer, Kernel Based Virtual Machine (KVM), or Microsoft Hyper-V. The virtual machine server can be configured to run a customized hypervisor (whether as a modified version of a commercially-available hypervisor, or a custom-built hypervisor). The customizations allow the virtualization platform to speed up the passage of time, as viewed from the perspective of the executing malware (running in a guest system of the host), without the malware being aware that timing has been altered. As will be described in more detail below, by accelerating timer interrupts when the guest is idle, and maintaining the consistency of the guest's clocks, the guest will skip wait states, radically accelerate execution of the sample. By setting the guest clock to a time in the future or past, DGA malware will produce the appropriate domain names for that time, and those domain names can be collected for a variety of purposes.

Two examples of hypervisor customizations are as follows: The HLT instruction (also referred to herein as a HALT instruction) on the x86 platform causes the processor to put all non-essential parts to sleep to save power, and do nothing until the next hardware interrupt (e.g., a keyboard press, or the scheduler timer expires). The scheduler will try to remain in the HALTed state as much as possible if it determines that the user is idle and there is no batch processing to do. Virtualization platforms typically emulate HALT instructions by using a sleep( ) call (e.g., with sleep(500) in a process yielding time for the next 500 seconds to the platform). A first customization of the hypervisor is that, whenever the instruction dispatcher routine receives a HALT instruction, instead of sleep( )ing for a given period of time (e.g., specified by the call, such as 500 seconds), the sleep is set to zero seconds (making the HALT into a NOP) or another, shorter amount of time. This modification is also referred to herein as a "time interrupt" modification. A second customization of the hypervisor is also referred to herein as a "time polling" modification. In this second customization, the hypervisor is modified to intercept access to time values read from memory or a register—supplying an alternate, monotonically increasing value. As long as the times supplied by the hypervisor are consistent across the various time sources, guest software will still run correctly (and the malware will not notice/detect the customized time). The two modifications can also be used in conjunction, such that the various guest time sources are advanced by an amount corresponding to the amount of time originally specified in a sleep call. So, for example, if a sleep call of 500 seconds is received, and a sleep of zero seconds is instead performed, the various guest system time sources are advanced by their respective notions of 500 seconds.

In various embodiments, the guest system time sources comprise synthetic hardware time sources that the guest can query to get a time source. Each guest system time source in turn queries a time source made available by the hypervisor, and the customized hypervisor applies an appropriate transformation (e.g., of the host time) to provide a suitable, consistently erroneous time, to each type of guest time source. Examples of guest system time sources that are managed by the customized hypervisor include the realtime clock (RTC), the high precision event timer (HPET), the programmable interval timer (PIT), the timestamp counter (TSC), and the advanced programmable interrupt controller (APIC) timer. Various timers advance at different rates/frequencies, and the customized hypervisor is configured to advance each timer in accordance with its respective time keeping properties to maintain a unified guest time. When the process returns from the sleep( ) it will appear to the process that 500 seconds have elapsed, when in fact they have not (irrespective of which guest time source(s) are asked for the current guest time by the malware). Whether the malicious program is relying on number of time cycles elapsing (e.g., via sleep( )), the malicious program is reading time from a memory space (e.g., corresponding to one of the virtualized time sources), or both, the customized hypervisor can present a fabricated view of the guest time to the malicious program.

As will be described in more detail below, the hypervisor customizations will allow for the accelerated execution of the malware. The domain names that would otherwise be generated by malware 130 over the course of a day (e.g., once every five minutes when executing on a compromised client) will be generated much more quickly (e.g., once a second—or faster—when executing in the virtualized environment).

Below is an example of pseudo code for implementing a time-accelerated virtualized environment in accordance with embodiments of techniques described herein. In particular, this is an example of an instruction dispatch routine for emulating the HLT (opcode 0xf4) instruction on the Intel x86 architecture. In this example, the system can operate in one of two modes—a "TurboMode" where guest time is accelerated, and a non-TurboMode where guest time advances at the same rate as host time:

```
if(!IsTurboMode)){ //simulate normal timing (i.e., honor
sleep requests)
    while(!CheckForInterrupts( ))
        sleep(n);
}
else { //accelerate timing; advance the guest clock without
sleeping.
    // the GetNextInterruptTime function obtains the time
        when the
    // next scheduler interrupt will fire, which is the next time
        the
    // machine will wake up to run the scheduler—which will
    // determine if there is any work for to do. If the scheduler
        finds
    // no work, it will re-execute the HLT instruction.
    nextInterruptTime=GetNextInterruptTime( ))
    SetGuestClock(nextInterruptTime);
}
```

Returning to the example of FIG. 1, the virtual machine servers can be separate from, but in communication with, data appliance 102, as shown. A virtual machine server can also perform some or all of the functions of data appliance 102 (or the subset of functions described herein as pertaining to the collection of algorithmically generated domains), and a separate data appliance 102 omitted as applicable. Further, a virtual machine server can be under the control of the same entity that administers data appliance 102 (e.g., virtual machine server 112); the virtual machine server can also be provided by a third party (e.g., virtual machine server 124, which can be configured to provide services to appliance 102 via third party service 122). In some embodiments, data appliance 102 is configured to use one or the other of virtual machine servers 112 and 124 for malware analysis. In other embodiments, data appliance 102 is configured to use the services of both servers (and/or additional servers not pictured). Further, in various embodiments, multiple virtual machine servers are present within the same platform. For example, cloud security service 122 can make use of multiple virtual machine servers (in addition to virtual machine server 124). In yet additional embodiments, at least some virtual machine servers are provided by an entity that is different from the operator of cloud security service 122. For example, cloud security service 122 could be operated by a computer security company which makes use of third party cloud computing services, such as Amazon Web Services (AWS) to provide at least some of the computer security company's virtual machine servers. Finally, while examples are described herein as making use of virtual machine servers (e.g., to allow for a single host system executing multiple guest systems at once), the techniques described herein, and in particular, the activities described as being performed inside a guest system, can also be performed using non-virtualized hardware (e.g., to thwart anti-virtual-machine techniques employed by malware). For example, the customizations described herein as being made to a hypervisor can instead/in addition be made to an operating system running on a non-virtualized system, with DGA malware executing on the non-virtualized system and domain names collected in accordance with adaptations of the techniques described herein. For example, the operating system can be modified (or shimmed, etc., as applicable) such that time requests intended for the non-virtualized system's hardware time sources are intercepted, and an appropriately (artificially) advanced time is provided (e.g., to requesting malware). The artificially advanced time on a non-virtualized system is also referred to herein as a "virtualized time."

Figure 2:
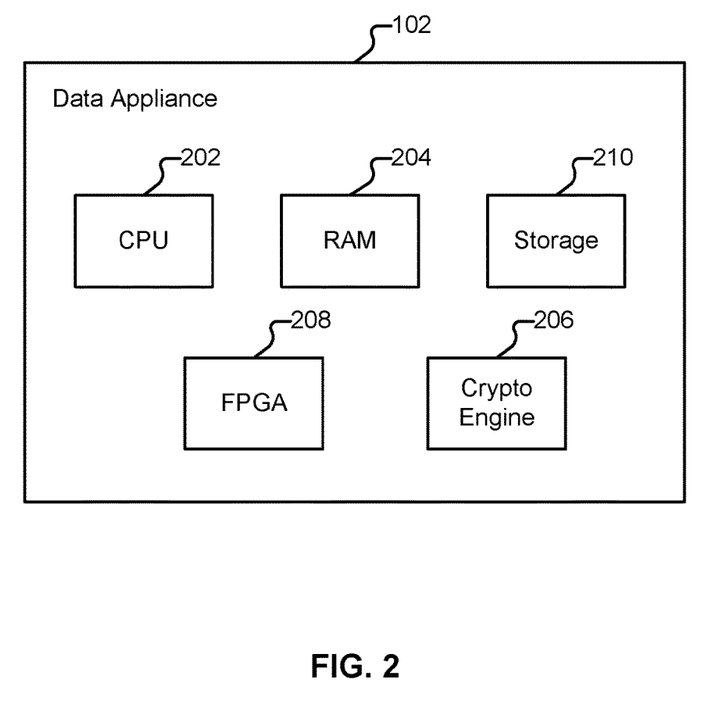
FIG. 2 illustrates an embodiment of a data appliance.

FIG. 2 illustrates an embodiment of a data appliance. The example shown is a representation of physical components that are included in appliance 102, in some embodiments. Specifically, appliance 102 includes a high performance multi-core CPU 202 and RAM 204. Appliance 102 also includes a storage 210 (such as one or more hard disks), which is used to store policy and other configuration information, as well as URL information. Data appliance 102 can also include one or more optional hardware accelerators. For example, data appliance 102 can include a cryptographic engine 206 configured to perform encryption and decryption operations, and one or more FPGAs 208 configured to perform matching, act as network processors, and/or perform other tasks.

Using Virtual Machines to Analyze Files

A virtual machine (VM) can be used to perform behavior profiling (e.g., in a VM sandbox environment) using various heuristic-based analysis techniques that can be performed in real-time during a file transfer (e.g., during an active file/attachment download) and/or on files previously collected (e.g., a collection of files submitted for batch analysis). Documents, executables, and other forms of potentially malicious software (e.g., to be evaluated) are referred to herein as "samples."

Returning to the example of FIG. 1, suppose a malicious user of system 120 sends an email message to a user of client 104 that includes a malicious attachment. The attachment may be an executable (e.g., having a .exe extension) and may also be a document (e.g., a .doc or .pdf file). The message is received by data appliance 102, which determines whether a signature for the attachment is present on data appliance 102. A signature, if present, can indicate that the attachment is known to be safe, and can also indicate that the attachment is known to be malicious, in accordance with various embodiments. If no signature for the attachment is found, data appliance 102 is configured to provide the attachment to a virtual machine server, such as virtual machine server 112 or 124, for analysis.

Figure 3:
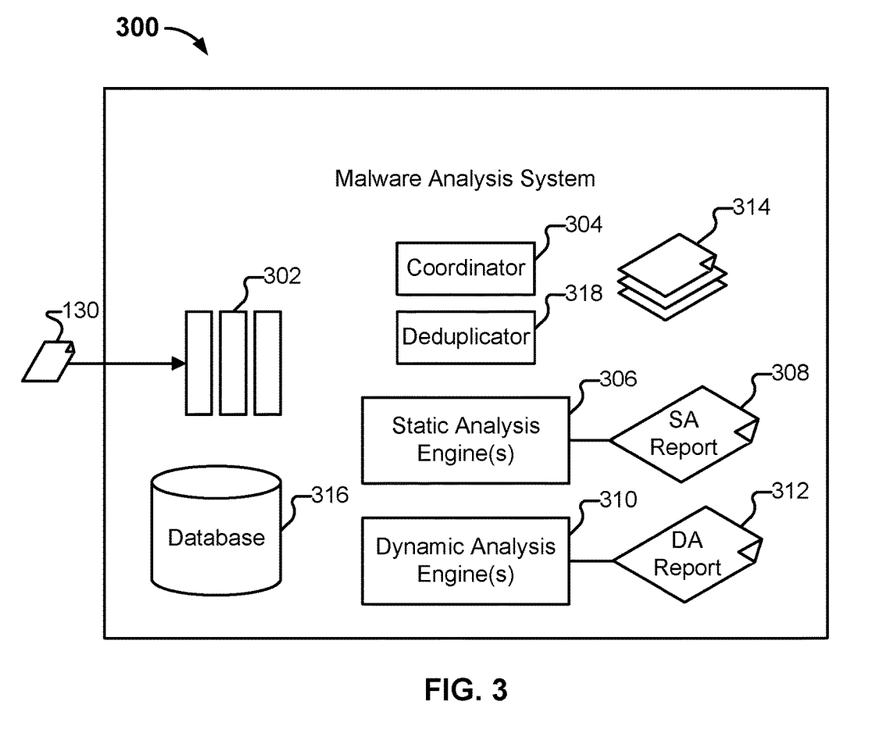
FIG. 3 illustrates an example of logical components that can be included in a system for analyzing candidate malware.

Virtual machine server 112 is configured to perform static analysis of samples, and also to perform dynamic analysis of samples, in which the samples are executed (or opened in an application, as applicable) in one or more virtual machine instances 114-116. The virtual machine instances may all execute the same operating system (e.g., Microsoft Windows XP SP 3), may execute different operating systems, and/or may collectively execute combinations of operating systems (and/or versions thereof) (e.g., with VM instance 116 emulating an Android operating system). In some embodiments, the VM image(s) chosen to analyze the attachment are selected to match the operating system of the intended recipient of the attachment being analyzed (e.g., where the operating system of client 104 is Microsoft Windows XP SP 2). Observed behaviors resulting from executing/opening the attachment (such as changes to certain platform, software, or registry settings, as well as any network connection attempts made) are logged and analyzed for indications that the attachment is malicious. In some embodiments, the dynamic analysis is performed in two stages. In a first stage, external domains that a given piece of malware attempts to contact (e.g., when executing in a virtual machine instance) are logged and then analyzed as a set for indications that the contact attempts are indicative of the sample algorithmically generating domain names. One approach to perform such analysis is to examine (e.g., using an entropy module) the entropy of any domains with which contact is attempted by the malware sample (e.g., with "kittens.example.com" having low entropy and "23rkjf9823r5hfd8723r5.com" having high entropy). The entropy analysis can be performed by a variety of components, such as an embodiment of dynamic analysis engine 310, coordinator 304, or a standalone entropy analysis component. A malware sample that appears to be using a domain generation algorithm can then undergo a second stage of dynamic analysis in which the domain names it generates are collected (described in more detail below, e.g., in conjunction with process 400 of FIG. 4). In some embodiments, the first stage is omitted (e.g., with all samples undergoing the second stage of dynamic analysis, and/or where a separate component or set of components has previously determined that the sample is making use of a domain generation algorithm).

In some embodiments log analysis (e.g., of results of static/dynamic analysis) is performed by the VM server (e.g., VM server 112). In other embodiments, the analysis is performed at least in part by appliance 102. The malware analysis and enforcement functionality illustrated in FIG. 1 as being provided by data appliance 102 and VM server 112 is also referred to herein as being provided by malware analysis system 132. As explained above, portions of malware analysis system 132 may be provided by multiple distinct devices, but may also be provided on a single platform, as applicable. For example, the functionality described herein (or portions thereof) as being provided by malware analysis system 132 can also be provided by cloud security service 122.

If the attachment is determined to be malicious, appliance 102 can automatically block the file download based on the analysis result. Further, a signature can be generated and distributed (e.g., to other data appliances, and/or to cloud security service 122) to automatically block future file transfer requests to download the file determined to be malicious. As mentioned above, some types of malware (also referred to herein as "DGA malware") algorithmically generate domain names. Using techniques described herein, a list of domains generated by a piece of DGA malware can be efficiently collected (e.g., as output during static/dynamic analysis of the malware) and used in a variety of ways.

FIG. 3 illustrates an example of logical components that can be included in a system for analyzing candidate malware. System 300 can be implemented using a single physical device. System 300 can also be implemented, collectively, across multiple distinct devices. For example, when data appliance 102 works in combination with virtual machine server 112, malware analysis system 132 is an embodiment of system 300. As another example, the functionality of system 300 can be provided by cloud security service 122. As explained above, cloud security service 122 can include a single (124), or multiple virtual machine servers.

As mentioned above, a given piece of candidate malware (e.g., a potentially malicious document/file/etc.) can be received for analysis in a variety of ways. In the following discussion, malware 130 (intended for a client such as client 104 by a malware author) is received by platform 102 and a check is made (e.g., against information stored in storage 210) to determine whether malware 130 matches any signatures of known malware. Suppose in the following example that no such signature is present on platform 102, and also that no such signature is present on cloud security service 122 (where platform 102 is configured to check for the existence of a signature on service 122). Platform 102 sends a copy of malware 130 to cloud security service 122 for further analysis (e.g., before allowing it to be delivered to client device 104). In various embodiments, when a new piece of candidate malware is received for analysis (e.g., an existing signature associated with the file is not present at cloud security service 122), it is added to a processing queue 302.

Coordinator 304 monitors queue 302, and as resources (e.g., a static analysis worker) become available, coordinator 304 fetches a piece of potential malware for analysis from queue 302 for processing (e.g., fetches a copy of malware 130). In particular, coordinator 304 first provides the application to static analysis engine 306 for static analysis. In some embodiments, one or more static analysis engines are included within system 300, where system 300 is a single device. In other embodiments, static analysis is performed by a separate static analysis server that includes a plurality of workers (i.e., a plurality of instances of static analysis engine 306). In yet other embodiments, static analysis is omitted, or provided by a third party, as applicable.

The static analysis engine obtains general information about the candidate malware and includes it (along with heuristic and other information, as applicable) in a static analysis report 308. The report can be created by the static analysis engine, or by coordinator 304 (or by another appropriate component) which can be configured to receive the information from static analysis engine 306. In some embodiments, the collected information is stored in one or more database records for the candidate malware (e.g., in a database 316), instead of or in addition to a separate static analysis report 308 being created (i.e., portions of the database record form the static analysis report 308).

Once the static analysis is complete, coordinator 304 locates an available dynamic analysis engine 310 to perform dynamic analysis on the candidate malware. As with static analysis engine 306, system 300 can include one or more dynamic analysis engines directly. In other embodiments, dynamic analysis is performed by a separate dynamic analysis server that includes a plurality of workers (i.e., a plurality of instances of dynamic analysis engine 310).

Each dynamic analysis engine manages a virtual machine instance. In some embodiments, results of static analysis (e.g., performed by static analysis engine 306), whether in report form (308) and/or as stored, e.g., in database 316, are provided as input to a dynamic analysis engine 310. For example, the static analysis report information can be used to help select/customize the virtual machine instance used by dynamic analysis engine 310 (e.g. Microsoft Windows XP SP 3 vs. Windows 7 SP 2). Where multiple virtual machine instances are executed at the same time, a single dynamic analysis engine can manage all of the instances, or multiple dynamic analysis engines can be used (e.g., with each managing its own virtual machine instance), as applicable. As will be explained in more detail below, during the dynamic portion of the analysis, actions taken by the application are analyzed. For example, a list of any domains dynamically generated by the application is collected (e.g., domains which the application attempts to access that are not hard coded/were otherwise not discovered during static analysis).

In various embodiments, static analysis of candidate malware is omitted or is performed by a separate entity, as applicable. As one example, traditional static and/or dynamic analysis may be performed on files by a first entity. Once it is determined (e.g., by the first entity) that a given file is malicious, and more particularly, that the file is (or is potentially) making use of algorithmically generated domains, the file can be provided to a second entity (e.g., the operator of cloud security service 122) specifically for additional analysis with respect to the malware's use of algorithmically generated domains (e.g., by a dynamic analysis engine 310).

Collecting Algorithmically Generated Domains

Figure 4:
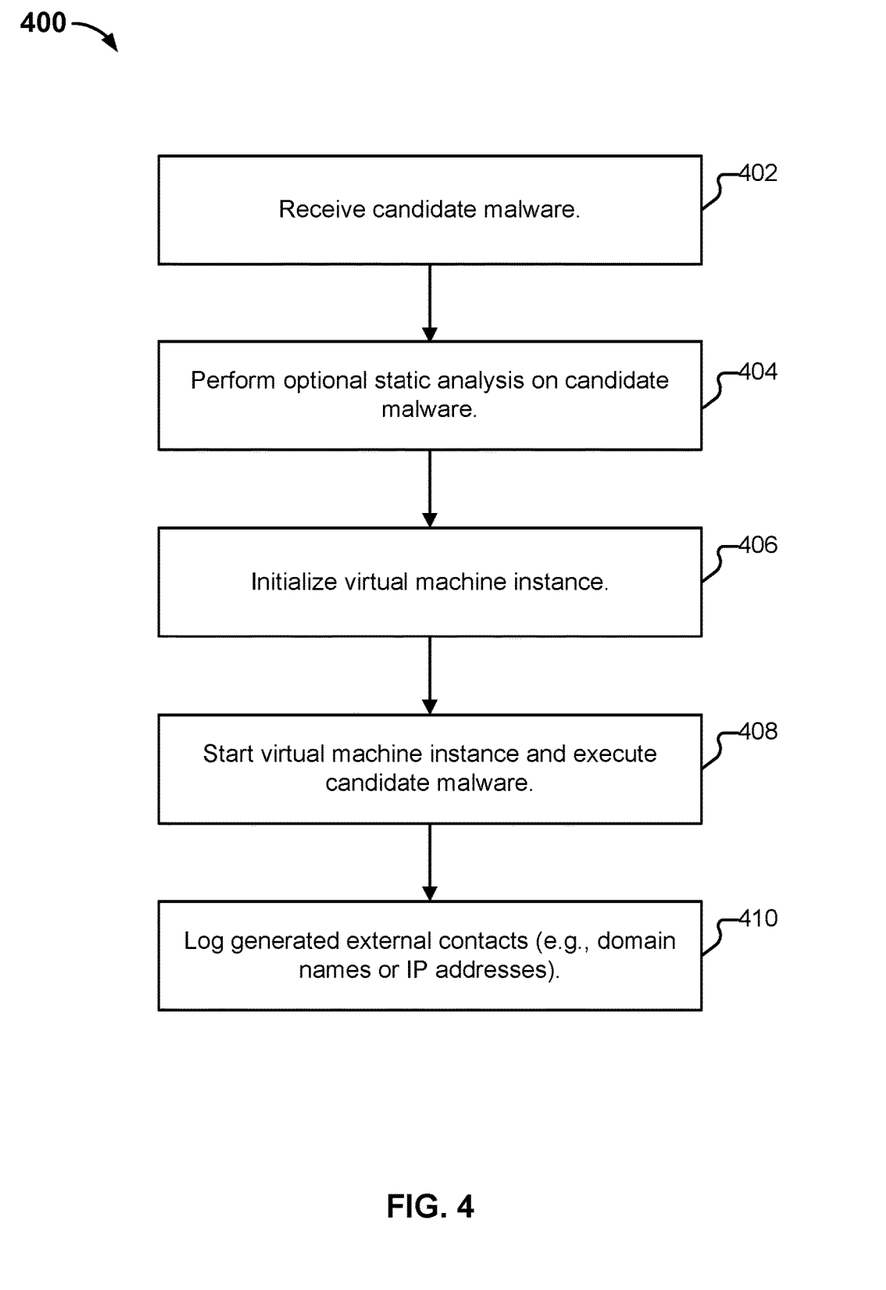
FIG. 4 illustrates an embodiment of a process for collecting algorithmically generated domains.

FIG. 4 illustrates an embodiment of a process for collecting algorithmically generated domains. In various embodiments, process 400 is performed by system 300 (examples of which include malware analysis system 132 and cloud security service 122). The process begins at 402 when candidate malware is received. As one example, candidate malware is received at 402 when an email (including an attachment) is received by data appliance 102 from system 120. As another example, data appliance 102 can be configured to transmit the attachment to service 122 for analysis. In that scenario, the candidate malware is received by service 122 at 402. As yet another example, candidate malware can be received at 402 as part of a batch operation (e.g., where cloud security service 122 receives a variety of malware samples over a period of time and a batch of received samples is provided to virtual machine server 124 for processing—with virtual machine server 124 receiving the batch at 402). Further, the batch operation can be repeated (e.g., on the same set of samples—or on a set that includes at least some of the same samples as previous batches). One reason to repeat such processing is where, e.g., the collection of algorithmically generated domains is to be performed on a recurring basis (e.g., once a week) using all known DGA malware samples.

As mentioned above, static analysis can optionally be performed on the sample (e.g., at 404). At 406, a virtual machine instance is initialized, setting up the running environment for the malware to be tested (e.g., malware 130). As explained above, the hypervisor controlling the virtual machine instance can be customized to support "time interrupt" and "time polling" features. In addition, at 406, a specific time/date can be set within the virtual machine instance (i.e., the guest time can be set to a specific date and time). As one example, suppose the actual date and time that process 400 is performed is Jan. 1, 2014 (at one second after midnight). One reason to perform process 400 is to determine which domains a malicious sample will (when executed on a compromised client device) generate, at a future time, so that remedial actions (described in more detail below) can be taken before that future time arrives. So for example, while the analysis is performed on Jan. 1, 2014, one of the initializations that could be made (e.g., at 406) could be to set the guest date/time to Jan. 2, 2014 (or Jan. 3, 2014, etc.) at one second after midnight, or another appropriate time. The guest date/time can similarly be set in the past (e.g., to collect historical data on the malware's domain generation).

At 408, the virtual machine instance is started, and the candidate malware (e.g., malware sample 130) is executed in the virtual machine instance. The virtual environment is instrumented/hooked, as applicable, such that behaviors observed while the application is executing are logged. For example, a log is created of activities as they occur in the virtual machine instance (e.g., using a customized kernel that supports hooking and logcat). Further, network traffic associated with the virtual machine instance is captured (e.g., using pcap). As with the static analysis engine, the dynamic analysis engine stores the results of its analysis in database 316 in the record(s) associated with the application being tested (and/or includes the results in report 312 as applicable).

Any attempts at external contacts made by the virtual machine instance are recorded (e.g., at 410), along with the guest time at which the requests were made. As one example, DNS requests made by the virtual machine instance are recorded. The logged external contact attempts represent the domains that will be generated by malware 130 when executing on a compromised client at that future time. Another example of a connection attempt that can be collected at 410 is one using an IP address (e.g., where the malware is configured to algorithmically generate IP addresses instead of or in addition to domain names). In various embodiments, the attempts at external contacts (and the guest time at which they were made) are stored in database 316 (or another appropriate location) in a record associated with the malware sample being analyzed (e.g., keyed using a hash of the sample).

One countermeasure a malware author might employ, to try to defeat analysis by platform 300, is the use of an external time source. For example, instead of or in addition to polling a local time source for a current time (e.g., to use as a seed, or as a 500 second countdown timer), malware 130 might attempt to obtain a current time from a remote Network Time Protocol (NTP) server. The malware could use the NTP server's time source to generate domains (e.g., as a seed), ignoring any local time sources, or use the NTP server's response in combination with a local time. The malware could also use the existence of a discrepancy between the NTP server's reported time and a local time source as an indication that the malware is executing in a virtualized environment (i.e., is being analyzed for maliciousness) and stop executing (e.g., to avoid further scrutiny).

In various embodiments, system 300 includes an NTP server emulator. The emulator intercepts NTP requests (e.g., from malware 130 when executing on system 300) and responds with a fabricated time (e.g., that matches the current guest time). The emulator can be implemented in a variety of ways. As one example, the guest operating system's network stack can be modified to divert any NTP requests to the emulator. As another example, the emulator can be implemented as a traditional NTP server (but one modified to respond with times selected by system 300, as applicable). Other external time sources (e.g., using protocols other than NTP) can similarly be simulated.

In some cases, the external time source used by malware 130 might be a public time source (e.g., time.nist.gov). In other cases, the external time source might be under the control of the malware author (or a cohort). In various embodiments, system 300 (or another appropriate entity, as applicable), is configured to evaluate any NTP requests made by malware (such as malware 130) while executing in a virtual machine instance. In particular, any requests made of suspicious time sources (i.e., not to a well-known public source) can be flagged and used in other processing (e.g., added to one or more blacklists).

Remedial Actions

As explained above, a log of external contacts which malware sample 130 attempts to make (e.g., during dynamic analysis) is created (e.g., at 410). The list of external contact attempts (and times at which those contact attempts were attempted by the malware) can be used in a variety of ways. As a first example, the list can be provided to a DNS appliance (or appliance that includes a DNS module, such as DNS module 134). The DNS appliance/module can use the received list as a blacklist—refusing to resolve any requests made by a client (e.g., client 104) for a given blacklisted external contact (e.g., "2345smdjfui2345.com").

Another example remedial use of the list is for a legitimate entity to register the domains on the received list. As explained above, malware authors often wait to register a C&C domain until shortly before the C&C domain is needed. So, for example, if domain "hc739xh23.net" will be used by a malware author on Feb. 7, 2014, the author might wait until Feb. 6, 2014 to register the domain. Using the techniques described herein, a security company (e.g., operating cloud security service 122) could analyze malware 130 (e.g., on Feb. 1, 2014—using a virtual machine instance with a guest time set to Feb. 7, 2014) and learn that malware 130 will generate the domain "hc739xh23.net" on Feb. 7, 2014. The security company could itself register "hc739xh23.net" (before the malware author does), preventing the malware author from using the domain. In various embodiments, the security company will make a server reachable at "hc739xh23.net," set up a sinkhole, etc. The server can take a variety of actions, such as displaying a web page warning individuals that their computers have been compromised (but they are being protected by the security company). The server can also log any connection attempts to that server. The security company can use the logged connection attempts to the server it set up at "hc739xh23.net" for lead generation or other purposes.

Deduplicating Malware

Signature-based detection of malware is prevalent in the security industry, and in response malware authors are increasingly "repacking" their malware to thwart easy detection. In particular, malware authors will employ data obfuscation and other techniques that will result in programs that have identical (malicious) functionality (and are typically creating using identical source code) having very different executable files, which will yield very different signatures (e.g., different MD5, SHA-256, etc. signatures).

Suppose the author of malware 130 repacks the malware three times, sending different copies of malware 130 to each of clients 104, 106, and 108, respectively. The functionality of each copy will be the same (e.g., contact C&C server 150 and execute a cryptocurrency mining program), but to appliance 102, each copy appears to be a different attachment (i.e., each of the three files would have a respective different MD5 or other signature). Further suppose that appliance 102 does not have any signatures stored on it for any of the three received copies of malware 130 (i.e., the MD5 or other signatures of the three copies of malware 130 are not present on any blacklists or whitelists stored on appliance 102), and also that cloud security service 122 (when polled by appliance 102) also does not have any information pertaining to the three attachments. Appliance 102 might accordingly transmit each of the three attachments to cloud security service 122 for processing, before allowing the messages from system 120 to reach any of clients 104-108 (if at all). In this example, cloud security service 122 could wind up performing triple the work (i.e., performing a full set of static/dynamic analysis on each of the three copies of malware 130) than it otherwise would if the author had not employed repacking. In particular, if the author had not employed repacking, service 122 could have evaluated the first copy of malware 130 and reached a determination that the sample was malicious. Where the second and third samples are identical files (i.e., with identical signatures), service 122 would not need to examine the other two copies, and they would instead be flagged (e.g., by platform 102, or service 122, as applicable) as duplicates. However, the second and third copies, if repacked, will appear to be unique samples—and thus potentially require full analysis as well.

A variety of malware families employ domain generation algorithms, including Conficker, Murofet, BankPatch, Bonnana, and Bobax. As will be described in more detail below, the domains generated by DGA malware can be used as an alternate form of signature (i.e., instead of or in addition to a traditional MD5 or other cryptographic hash/signature). The DGA-based signature can be used to reduce the amount of time analysis of a given sample takes, and for other purposes.

Suppose a first malware sample undergoing analysis by system 300 (e.g., in accordance with portions of process 400) emits the following domains: "kjhdf2.com," "238dj23.com," "1jsd82.net," and "sdkj23.org" (e.g., with a guest clock set to Mar. 1, 2014 at 01:00 at the start of the analysis). When a second sample (also executing in a virtual machine instance with a guest clock set to Mar. 1, 2014 at 01:00) also emits the domains: "kjhdf2.com," "238dj23.com," "1jsd82.net," and "sdkj23.org," an inference can be made that the first and second samples are the same malware (but have undergone repacking).

Once the second sample has been identified as a duplicate of the first sample (e.g., by a deduplication module 318, or coordinator 304, or another component, as applicable), a variety of actions can be taken. As a first example, additional processing of the second sample can be terminated, saving resources. As a second example, malware samples can be tied back to their sources (e.g., using database 316). For example, suppose the first and second samples are received (e.g., by cloud security service 122) from two different banking institutions. Using conventional signature-based approaches, the two samples would have two different signatures, and could potentially have been created by two different authors. Once it is discovered that the two samples use identical DGAs, an inference can be made that the author of both samples is the same (and, that the same entity is attacking both banks).

Figure 5:
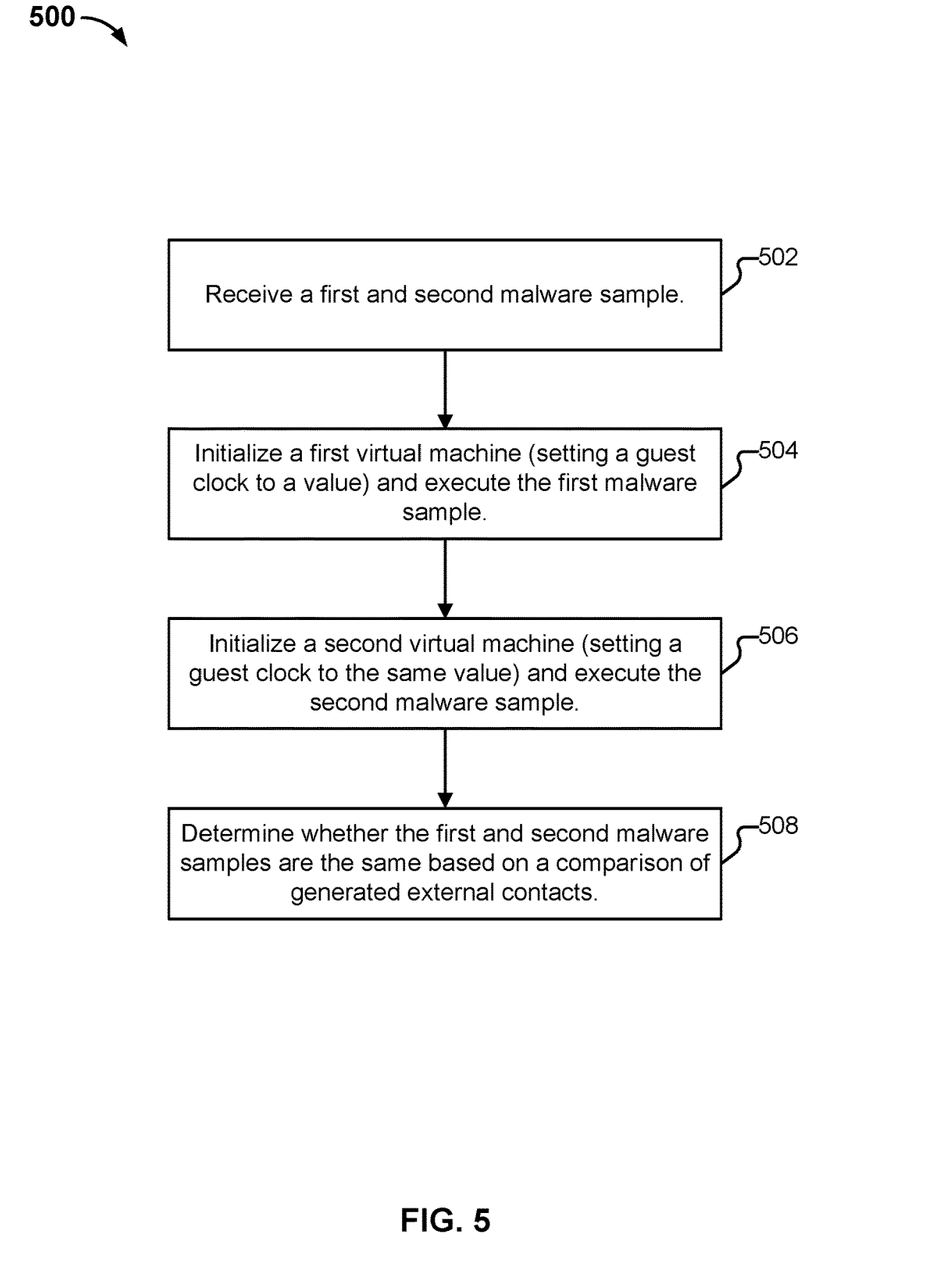
FIG. 5 illustrates an embodiment of a process for detecting duplicate malware samples.

FIG. 5 illustrates an embodiment of a process for detecting duplicate malware samples. In various embodiments, process 500 is performed by system 300. The process begins at 502 when a first and second malware sample are received. As explained above, malware samples can be received in a variety of ways. In the following example, suppose the first and second malware sample are received at 502 as submissions from appliance 102. The two samples can be received in parallel and can also be received in sequence. Further, the samples can be received at two different times and from two different sources (e.g., with the first sample being provided by platform 102 and the second sample obtained from database 316 or another appliance, as applicable). Portions 504 and 506 of process 500 (described in more detail below) can be performed in parallel with one another, in sequence, or asynchronously.

At 504, a first virtual machine instance is initialized (e.g., in accordance with portion 406 of process 400) and the first malware sample is executed in that first virtual machine (e.g., in accordance with portion 408 of process 400). Any external contacts made by the virtual machine instance will be recorded (e.g., in accordance with portion 410 of process 400). And, as applicable, NTP or other network traffic can be emulated (e.g., using an NTP server emulator) or simulated. One example of portion 504 of process 500 is as follows. A first malware sample is executed in a first virtual machine instance (optionally configured to support the time interrupt/time polling customizations described above), with a starting guest time of Mar. 1, 2014 (at 01:00). The malware is allowed to continue executing for a set period of time (e.g., one day of guest time having elapsed), until a threshold number of external contact attempts have been made (e.g., ten domain names have been collected), or until another appropriate stopping point is reached. The external contact attempts made by the malware are stored, e.g. in database 316, in a manner that associates the generated domains (or IP addresses, as applicable) with the malware being evaluated (e.g., using one or more database entries).

At 506, portion 504 of process 500 is repeated, using the same virtual machine initializations, but with the second sample. An example of portion 506 of process 500 is as follows. The second malware sample is executed in a second virtual machine instance that has been configured the same way the first virtual machine instance was configured. Specifically, the starting guest time will also be set to Mar. 1, 2014 (at 01:00). And, if the time polling customizations described above were used in the environment the first sample was executed in, they are also used in the environment executing the second sample. The executing environment for both the first and second malware samples should thus appear identical to the two respective samples. As with the first malware sample, the external contact attempts by the second malware sample are stored, e.g., in database 316, in a manner that associates the generated domains (or IP addresses, as applicable) with the malware being evaluated. In various embodiments, any network traffic received by the first virtual machine is captured and replayed during the execution of the second virtual machine (instead of, for example, the second virtual machine receiving live network traffic). Suppose, for example, the first malware sample requests a page (e.g., the front page of yahoo.com) during execution. The page includes various live elements, like a current date/time, top stories, etc. During execution of the second malware sample, when the same request is made (e.g., the front page of yahoo.com), the data sent from yahoo.com to the first virtual machine is replayed for the second sample, instead of the second sample receiving a current copy of the page.

Finally, at 508, a determination is made as to whether or not the first and second sample are the same based on a comparison of their respective generated external contacts. The determination can be made in conjunction with portions 504/506 of process 500 (e.g., as part of a realtime analysis/determination). For example, one of the tasks performed by coordinator 304 can be to monitor additions as they are made to database 316, checking for evidence of duplicate malware samples by checking for an existing entry of an external contact attempt (i.e., associated with previously analyzed malware) when adding external contact attempts for a newly analyzed sample. Additions of external contact attempts can be added to database 316 as a given malware sample is being analyzed (i.e., in realtime, as a malware sample generates a new external contact it can be added to database 316), and also can be added as a batch after analysis of the sample ends.

The determination of 508 can also be made asynchronously with the processing performed at 504/506. For example, coordinator 304, or another component, such as a deduplicator 318 can periodically query database 316 for generated external contacts (e.g., once an hour or once a day) and determine whether multiple samples (whether a pair of samples, or more than two samples) share generated external contacts.

The operating environments the first and second malware samples are executing in are tightly controlled. Where both samples produce the same sequence of external contact attempts, an inference can be made that the first and second samples are the same. A variety of approaches can be used to determine similarity. As one example, a requirement can be imposed (e.g., by a rule configuration of deduplicator 318) that all external contact attempts made by both the first and second samples must be identical in order for the samples to be considered the same. As additional examples, a requirement can be imposed that a threshold number of external contact attempts (e.g., ten) be common across the first and second sample, a threshold percentage of external contact attempts (e.g., 75%) be common across the first and second sample, and/or a threshold number of external contact attempts (e.g., four) occur in a sequence (e.g., where the first sample has the sequence A, B, C, D, E, F, G, H, I and the second sample has the sequence, X, Y, Z, A, B, C, D . . . ). Further, in various embodiments, multiple thresholds are used to determine sameness. For example, results above a first threshold (e.g., above a 75% match or at least four identical external contact attempts in a row) can be used to flag two samples as being identical. Results below the first threshold but above a second threshold (e.g., 50-57% match or 2-3 identical external contact attempts in a row) can be used to flag two samples as being related.

In various embodiments, process 500 is performed using the same malware sample as both the first and second malware samples. This can be done, for example, as a quality assurance check—to ensure that two identical samples (namely, two identical copies of a given malware sample) generate identical external contact attempts. In the event the two identical copies generate different external contact attempts, this can be a sign that the domain generation algorithm used by the malware is engaging in anti-virtual machine or other techniques. This can also be a sign that platform 300 is misconfigured. An administrator (e.g., of platform 300) can be alerted that there is a potential problem with platform 300 in response to a determination being made (e.g., at 508) that two different sets of external contacts were generated when it was expected that the external contacts be the same.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A system, comprising:
 a processor configured to:
  execute, in an accelerated computing environment, a malware sample, wherein a guest time associated with the accelerated computing environment is artificially advanced by at least one of a hypervisor and an operating system, wherein the artificially advanced guest time advances faster than a host time associated with the system advances, and wherein artificially advancing the guest time causes the malware sample to execute a plurality of actions faster than the malware sample would execute the plurality of actions in the event the guest time was not artificially advanced;
  provide an emulated response to a Network Time Protocol (NTP) request received from the executing malware sample;
  record a set of domain names algorithmically generated by the executing malware sample; and
  take at least one remedial action with respect to at least one domain name included in the recorded set of domain names; and
 a memory coupled to the processor and configured to provide the processor with instructions.

2. The system of claim 1 wherein the accelerated computing environment comprises a virtual machine instance.

3. The system of claim 2 wherein the accelerated computing environment is selectively accelerated by the hypervisor and wherein the hypervisor is configured to accelerate the guest time using a time interrupt customization.

4. The system of claim 2 wherein the accelerated computing environment is selectively accelerated by the hypervisor and wherein the hypervisor is configured to accelerate the guest time using a time polling customization.

5. The system of claim 1 wherein the accelerated computing environment comprises a non-virtualized platform and wherein the operating system is configured to accelerate the guest time using at least one of a time interrupt customization and a time polling customization.

6. The system of claim 1 wherein advancing the guest time includes advancing a plurality of virtualized time sources.

7. The system of claim 6 wherein advancing the plurality of virtualized time sources includes determining, for each virtualized time source included in the plurality of virtualized time sources, a respective transformation applicable to a given type of virtualized time source.

8. The system of claim 1 wherein a HALT instruction, when received by the system from the malware sample, is returned from at a first time that is shorter than a second time expected by the malware sample.

9. The system of claim 8 wherein at least one time source associated with the accelerated computing environment is advanced in response to the HALT instruction.

10. The system of claim 8 wherein a virtualized time source is advanced by a difference between the first time and the second time.

11. The system of claim 8 wherein, when the HALT instruction is received, a sleep time is reduced.

12. The system of claim 11 wherein the sleep time is set to zero.

13. The system of claim 1 wherein the at least one remedial action includes registering the at least one domain name.

14. The system of claim 1 wherein the at least one remedial action includes adding the at least one domain name to a blacklist of domain names.

15. The system of claim 1 wherein the guest time is initialized to a future time that is selected by an administrator as a starting time from which the algorithmically generated domain names are to be generated.

16. The system of claim 1 wherein recording the set of domain names includes logging DNS requests made by the malware sample executing in the accelerated computing environment.

17. The system of claim 1 further comprising an entropy testing module configured to determine that the malware sample exhibits algorithmic domain generation properties when executed, and in response, causes the execution of the sample in the accelerated computing environment.

18. The system of claim 1 wherein providing the emulated response to the NTP request includes responding with the guest time.

19. A method, comprising:
executing, in an accelerated computing environment, a malware sample, wherein a guest time associated with the accelerated computing environment is artificially advanced by at least one of a hypervisor and an operating system, wherein the artificially advanced guest time advances faster than a host time associated with the accelerated computing environment advances, and wherein artificially advancing the guest time causes the malware sample to execute a plurality of actions faster than the malware sample would execute the plurality of actions in the event the guest time was not artificially advanced;
providing an emulated response to a Network Time Protocol (NTP) request received from the executing malware sample;
recording a set of domain names algorithmically generated by the executing malware sample; and
taking at least one remedial action with respect to at least one domain name included in the recorded set of domain names.

20. The method of claim 19 wherein the accelerated computing environment comprises a virtual machine instance.

21. The method of claim 20 wherein the accelerated computing environment is selectively accelerated by the hypervisor and wherein the hypervisor is configured to accelerate the guest time using a time interrupt customization.

22. The method of claim 20 wherein the accelerated computing environment is selectively accelerated by the hypervisor and wherein the hypervisor is configured to accelerate the guest time using a time polling customization.

23. The method of claim 19 wherein the accelerated computing environment comprises a non-virtualized platform and wherein the operating system is configured to accelerate the guest time using at least one of a time interrupt customization and a time polling customization.

24. The method of claim 19 wherein advancing the guest time includes advancing a plurality of virtualized time sources.

25. The method of claim 24 wherein advancing the plurality of virtualized time sources includes determining, for each virtualized time source included in the plurality of virtualized time sources, a respective transformation applicable to a given type of virtualized time source.

26. The method of claim 19 wherein a HALT instruction, when received from the malware sample, is returned from at a first time that is shorter than a second time expected by the malware sample.

27. The method of claim 26 wherein at least one time source associated with the accelerated computing environment is advanced in response to the HALT instruction.

28. The method of claim 26 wherein a virtualized time source is advanced by a difference between the first time and the second time.

29. The method of claim 26 wherein, when the HALT instruction is received, a sleep time is reduced.

30. The method of claim 29 wherein the sleep time is set to zero.

31. The method of claim 19 wherein the at least one remedial action includes registering the at least one domain name.

32. The method of claim 19 wherein the at least one remedial action includes adding the at least one domain name to a blacklist of domain names.

33. The method of claim 19 wherein the guest time is initialized to a future time that is selected by an administrator as a starting time from which the algorithmically generated domain names are to be generated.

34. The method of claim 19 wherein recording the set of domain names includes logging DNS requests made by the malware sample executing in the accelerated computing environment.

35. The method of claim 19 further comprising determining that the malware sample exhibits algorithmic domain generation properties when executed, and in response, causing the execution of the sample in the accelerated computing environment.

36. The method of claim 19 wherein providing the emulated response to the NTP request includes responding with the guest time.

* * * * *

UNITED STATES PATENT AND TRADEMARK OFFICE
CERTIFICATE OF CORRECTION

Page 1 of 1

PATENT NO. : 10,846,404 B1
APPLICATION NO. : 15/655779
DATED : November 24, 2020
INVENTOR(S) : Ryan C. Salsamendi and Robert A. Seger It is certified that error appears in the above-identified patent and that said Letters Patent is hereby corrected as shown below:

On the Title Page

In page 4, Column 2, item (56), other publications, cite No. 9, delete "Rasing et al., an" and insert --Blasing et al., An--, therefor.
In page 4, Column 2, item (56), other publications, cite No. 10, delete "Chapter 4: Guarding Against Network Intrusions" and insert --'Chapter 4: Guarding Against Network Intrusions'--, therefor.
In page 4, Column 2, item (56), other publications, cite No. 17, delete "83-4" and insert --8.3-4--, therefor.
In page 4, Column 1, item (56), other publications, cite No. 18, before "Devices", insert --Android--.

In the Specification

In Column 6, Line(s) 41, after "sleep()", insert --,--.

Signed and Sealed this
Eleventh Day of May, 2021

Drew Hirshfeld
*Performing the Functions and Duties of the*
*Under Secretary of Commerce for Intellectual Property and*
*Director of the United States Patent and Trademark Office*